United States Patent [19]
Hasnik

[11] Patent Number: 5,890,859
[45] Date of Patent: Apr. 6, 1999

[54] SECURITY ARRANGEMENT FOR DETERRING REMOVAL OF A NUT OR BOLT

[76] Inventor: Dean C. Hasnik, 15710 Sussex St., Livonia, Mich. 48154

[21] Appl. No.: 995,446

[22] Filed: Dec. 22, 1997

[51] Int. Cl.[6] ............................. F16B 19/00; F16B 33/00
[52] U.S. Cl. ........................... 411/372; 411/429; 411/910
[58] Field of Search ................................. 411/372, 373, 411/374, 429, 431, 910

[56] References Cited

U.S. PATENT DOCUMENTS

| | | | |
|---|---|---|---|
| 3,519,979 | 7/1970 | Bodenstein | 411/910 X |
| 4,284,300 | 8/1981 | Campbell | 411/910 X |
| 4,611,379 | 9/1986 | Heitzman | 411/373 X |
| 4,621,230 | 11/1986 | Crouch et al. | 411/373 X |
| 5,630,687 | 5/1997 | Robinson | 411/910 X |

*Primary Examiner*—Neill Wilson
*Attorney, Agent, or Firm*—John R. Benefiel

[57] ABSTRACT

A security arrangement for preventing removal of a bolt or nut threaded fastener including a shielding sleeve receiving the fastener hex portion, the threaded body passing out through a hole in a closed end in the sleeve. A socket wrench can be received in the open end and engage the hex element for wrenching. A blocking cap is received over the open end and a locking pin driven through a hole in one side of the cap, a pair of aligned holes in the sleeve end, and a blind hole extending partially into the inside of the opposite side of the blocking cap.

8 Claims, 2 Drawing Sheets

SECURITY ARRANGEMENT FOR DETERRING REMOVAL OF A NUT OR BOLT

BACKGROUND OF THE INVENTION

This invention concerns security arrangements for defeating the removal of the bolts (or nuts) incidental to unauthorized removal of equipment by thieves. A very common modern-day problem is the theft of air bag canisters from automobiles. Often, removal of two bolts enables removal of the air bag unit making it a tempting target in view of the high value of this component.

Many arrangements have been devised to defeat or deter unauthorized removal of bolts or nuts, including installing a shielding sleeve over the bolt or nut, with a locking plug held in the sleeve to block wrench access to the nut or bolt head.

The present inventor has heretofore filed a patent application on such a device, U.S. Ser. No. 08/782,633, filed on Jan. 14, 1997.

Such a device is effective but requires a key to remove the locking plug and a key locking mechanism adds significant cost to the device.

It is sufficient if thieves would be delayed in defeating a security device to an extent that they will simply select another car rather than make an attempt to defeat the security device. Thus, if a simpler device could accomplish this, it would be preferable over a more complex but more secure device.

It is the object of the present invention to provide a simple security arrangement for a nut or bolt head which sufficiently delays any removal attempt to provide effective deterrent against unauthorized removal.

SUMMARY OF THE INVENTION

This and other objects of the present invention, which will become apparent upon a reading of the following specification and claims, are achieved by a bolt/nut security arrangement including a heavy-walled shielding sleeve of hardened steel enclosing the head of a bolt or a nut, with the threaded body passing out through a hole in an otherwise closed end of the sleeve. The opposite end is open, allowing engagement access to the bolt head or nut with a socket wrench. The shielding sleeve open end is closed off to prevent access after tightening of the nut or bolt by a thick-walled blocking cap inserted over the open end and installation of a tightly fitted locking pin (preferably a roll pin) into a hole drilled into only one side of the cap, the hole aligned with holes at the open end through the sidewall of the sleeve. The locking pin is driven flush with the outer surface of the cap. This prevents access to the locking pin to defeat removal, such that a time-consuming drilling operation is required to remove the blocking cap.

While simple and economical, the arrangement is very effective and well suited to protecting air bag installations. Shielding sleeves of various lengths and/or spacers may be provided to properly locate the open end in a particular application where it can be accessed for installation of the blocking cap. The visible presence of the cap is also effective as a deterrent.

DETAILED DESCRIPTION

In the following detailed description, certain specific terminology will be employed for the sake of clarity and a particular embodiment described in accordance with the requirements of 35 USC 112, but it is to be understood that the same is not intended to be limiting and should not be so construed inasmuch as the invention is capable of taking many forms and variations within the scope of the appended claims.

Figure 1:
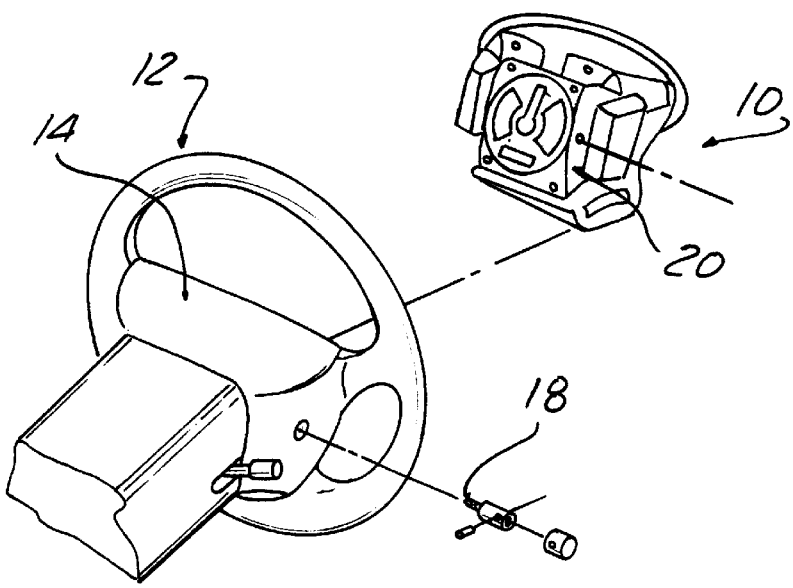
FIG. 1 is an exploded perspective fragmentary view of a steering wheel and driver's side air bag canister, and one of the retainer bolts, as well as the shielding sleeve, blocking cap and locking pin of the bolt/nut security arrangement according to the present invention.

Referring to the drawings and particularly FIG. 1, a driver's side air bag canister 10 is shown, adapted to be installed in the hub 14 of a steering wheel 12 of an automotive vehicle in the well-known fashion.

Such installations commonly use a series of bolts 18 received in threaded holes in side flanges 20 of the canister 10. Axially directed bolts or threaded studs with nuts installed on the bolt ends protruding through to the underside of the hub are also commonly used.

For installation and removal, the bolts 18 are reached through access holes 22 in the hub trim (covered with pop-out access plugs, not shown) with a socket wrench. Other designs use threaded studs or bolts passing axially through the hub with nuts installed on the ends thereof.

In order to render quick removal of at least one of the bolts or nuts impossible, a security arrangement according to the invention is installed to block wrench access to the hex-shaped surface of the bolt head or nut.

Figure 2:
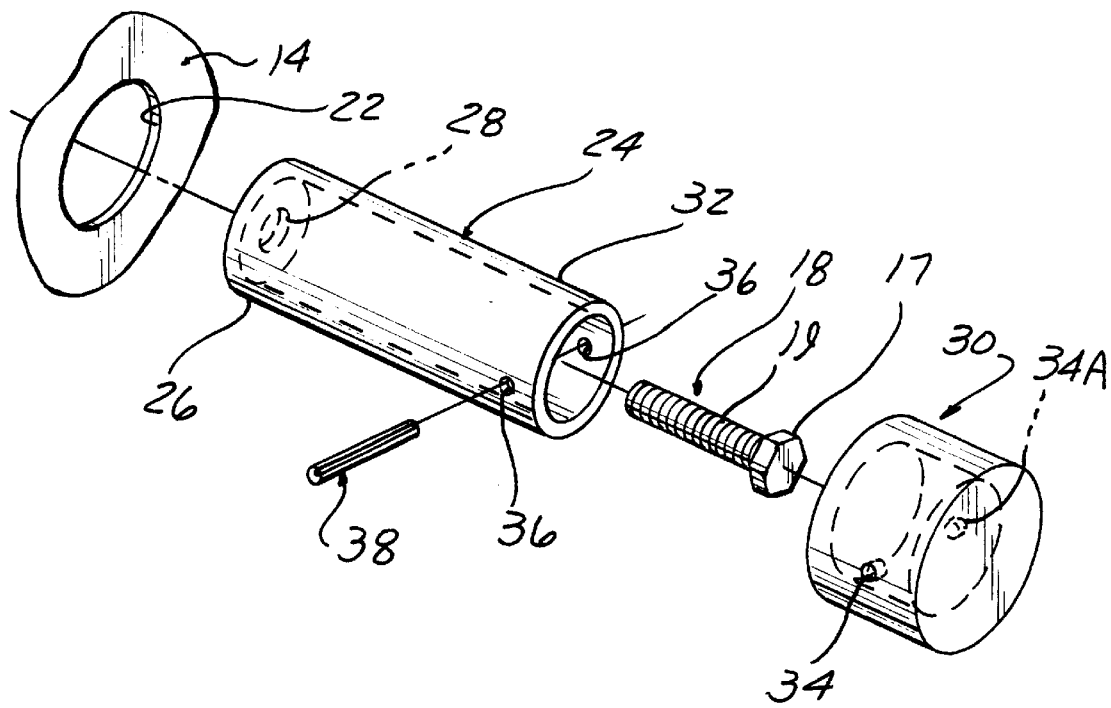
FIG. 2 an enlargement of the exploded perspective view of the air bag bolt, shielding sleeve, blocking cap, and locking pin shown in FIG. 1.

As best seen in FIG. 2, this arrangement includes a heavy-walled shielding sleeve 24 of hardened steel (50 Rockwell, C scale) and having an inside diameter allowing a socket wrench sized for the bolt used to be fit within the sleeve 24 and engage the hex surface of the bolt head or nut 17. The shielding sleeve 24 has a closed end 26 formed with a small hole 28 allowing the threaded body 19 of a bolt to pass through while preventing the bolt head or nut 17 from pulling through the hole 28.

A thick-walled blocking cap 30 is adapted to be received over the opposite open end 32 of the shielding sleeve 24. A radial hole 34 is drilled completely through one side only of the blocking cap 30. An aligned blind hole extends partially through the other side, adapted to be aligned with two aligned holes 36 through each side of the open end 32 when the blocking cap 30 is pushed onto the open end 32 of the shielding sleeve 24, and rotated as necessary.

A locking pin 38, sized to be tightly fit in the holes 34, 34A, 36 is then driven thereinto, as with a hammer.

Figure 3:
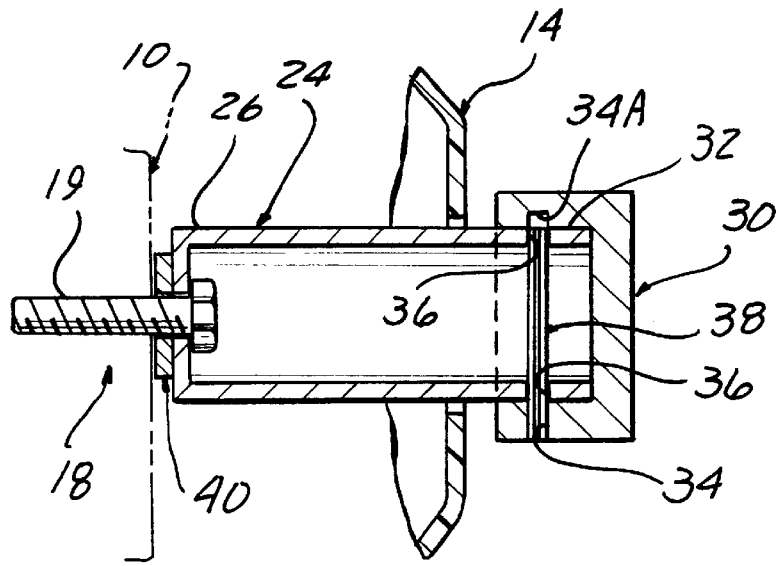
FIG. 3 is a lengthwise sectional view taken through the bolt/nut security arrangement components, including an optional spacer washer.

As seen in FIG. 3, the locking pin 38 is driven flush with the outer surface of the cap 30. In effect, holes 34, 34A, 36 define a blind hole preventing removal of the locking pin 38 as the locking pin 38 cannot be grasped to be pulled out or driven out with a punch.

Figure 4:
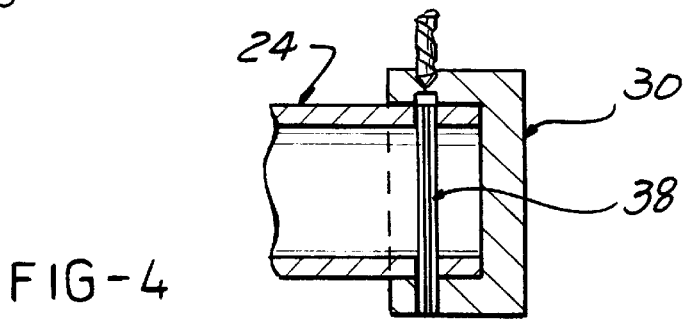
FIG. 4 is a fragmentary sectional view of the bolt/nut security arrangement of FIG. 3 showing drilling a second pin access hole in the blocking cap.

To remove the locking pin 38 requires drilling an oppositely located through hole in the sidewall of the blocking cap 30, as indicated in FIG. 4 and then the locking pin 38 may be driven out with a punch. This process is difficult and time consuming since the cap 30 has a thick wall (3/16") and is of hardened steel to require use of a carbide drill bit, such as to deter any attempt by would-be thieves. Since servicing of the air bag is seldom required, and this process may be easily carried out under shop conditions with proper tooling, removal for servicing is still easily practical.

The shielding sleeve 24 is of an appropriate length to position the open end 32 clear of the obstructing hub structure 14. A spacer washer 40 can also be used placed between the closed end 26 of the shielding sleeve 24 and the air bag canister 10 as shown, to position the open end 32 even further away as necessary. The spacer 40 may be ground as necessary to achieve a proper thickness.

Preferably, a thread locking compound is applied to the bolt threaded body 19 to resist backing out of the threads.

Figure 5:
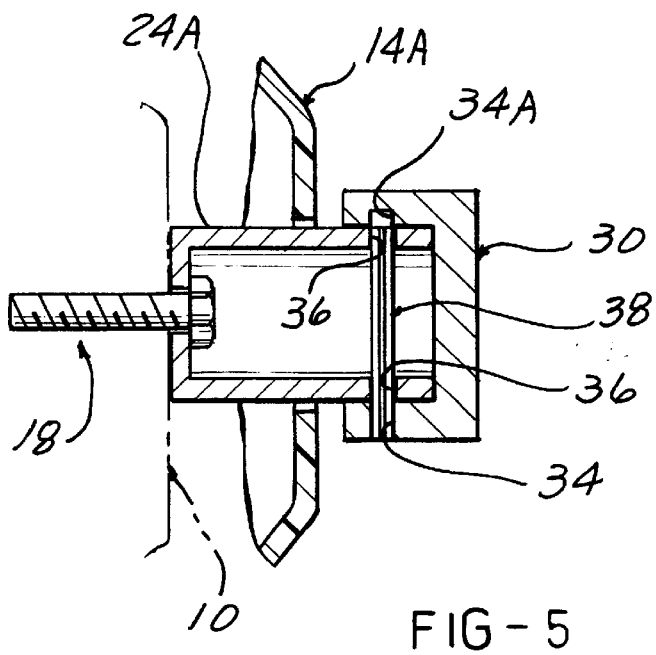
FIG. 5 is a sectional view through a short shielding sleeve installed in a different installation where a shorter sleeve can be used.

A shorter length shielding sleeve 24A can be employed where the hub trim 14A is closer as shown in FIG. 5.

Thus, an extremely simple yet effective deterrence is provided.

A highly visible bolt or nut should be selected so as to immediately discourage any attempt at removal.

I claim:

1. A bolt head/nut security arrangement comprising:
   a shielding sleeve closed at one end with a small hole allowing a threaded body to pass out while capturing the bold/nut within said shielding sleeve;
   said shielding sleeve accommodating said bolt head/nut with sufficient clearance to be adapted to be engaged by a socket wrench received through an opposite open end of said shielding sleeve for installation or removal;
   a blocking cap received over said open end of said shielding sleeve, said blocking cap having a hole extending radially completely through one sidewall of said blocking cap;
   a pair of transverse aligned holes extending through opposite sides of said open end of said shielding sleeve aligned with said radially extending hole in said blocking cap when said blocking cap is pushed onto said shielding sleeve open end;
   a locking pin press fit into said hole in said cap and said aligned holes in said shielding sleeve, whereby access to said bolt head/nut is prevented.

2. The arrangement according to claim 1 wherein said locking pin is a roll pin.

3. The arrangement according to claim 1 wherein said shielding sleeve and said blocking cap are constructed of hardened steel.

4. The arrangement according to claim 1 wherein a hole partially extends through the blocking cap aligned with said hole extending completely through one sidewall of said blocking cap.

5. A method of preventing removal of a threaded fastener having a threaded body and a hex head portion, comprising the steps of:
   passing the threaded body of the fastener through a hole in one end of a shielding sleeve, said hole sized to capture said hex head within said shielding sleeve;
   installing said threaded portion by engaging said hex head with a socket wrench passed into an opposite open end of said shielding sleeve and rotating said fastener with said socket wrench;
   installing a blocking cap on said open end of said shielding sleeve; and,
   driving a locking pin into a radial hole in one side only of said blocking cap and through said shielding sleeve to be tightly fit therein and flush with an adjacent outer surface of said blocking cap.

6. The method according to claim 5 farther including the step of applying locking compound to threaded body prior to installing said threaded fastener.

7. The method according to claim 5 further including the step of selecting a shielding sleeve of a length to locate said open end thereof to be accessible for installation of said blocking cap and locking pin.

8. The method according to claim 5 further including the step of removing said blocking cap by drilling a second hole in a side of said blocking cap opposite said first-mentioned hole and punching out said locking pin.

* * * * *

UNITED STATES PATENT AND TRADEMARK OFFICE
CERTIFICATE OF CORRECTION

PATENT NO. : 5,890,859
DATED : April 6, 1999
INVENTOR(S) : Dean C. Hasnik

It is certified that error appears in the above-indentified patent and that said Letters Patent is hereby corrected as shown below:

Column 3, line 1, after "FIG. 4" insert --,--.

Column 4, line 31, delete "farther" and insert therefor --further--.

Column 4, line 32, after "compound to" insert --the--.

Signed and Sealed this

Twelfth Day of October, 1999

Attest:

Q. TODD DICKINSON

*Attesting Officer*     *Acting Commissioner of Patents and Trademarks*